(12) United States Patent
Yamazaki et al.

(10) Patent No.: US 11,451,377 B2
(45) Date of Patent: Sep. 20, 2022

(54) IN-VEHICLE GATEWAY AND KEY MANAGEMENT DEVICE

(71) Applicant: HITACHI AUTOMOTIVE SYSTEMS, LTD., Hitachinaka (JP)

(72) Inventors: Hiroki Yamazaki, Ibaraki (JP); Mikio Kataoka, Ibaraki (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 289 days.

(21) Appl. No.: 16/334,128

(22) PCT Filed: Sep. 27, 2017

(86) PCT No.: PCT/JP2017/034858
§ 371 (c)(1),
(2) Date: Mar. 18, 2019

(87) PCT Pub. No.: WO2018/070242
PCT Pub. Date: Apr. 19, 2018

(65) Prior Publication Data
US 2019/0261176 A1    Aug. 22, 2019

(30) Foreign Application Priority Data
Oct. 13, 2016    (JP) .............................. JP2016-201397

(51) Int. Cl.
*H04W 4/44*    (2018.01)
*H04L 9/08*    (2006.01)
(Continued)

(52) U.S. Cl.
CPC .............. *H04L 9/0822* (2013.01); *H04L 9/08* (2013.01); *H04L 63/0869* (2013.01);
(Continued)

(58) Field of Classification Search
CPC . H04L 63/04; H04L 63/0428; H04L 63/0442; H04L 9/08; H04L 9/0816;
(Continued)

(56) References Cited

U.S. PATENT DOCUMENTS

2010/0031042 A1* 2/2010 Di Crescenzo ........... H04L 9/32
                                                        713/168
2011/0320089 A1   12/2011 Lewis
(Continued)

FOREIGN PATENT DOCUMENTS

JP    2012-147270 A    8/2012
JP    2013-138320 A    7/2013
(Continued)

OTHER PUBLICATIONS

International Search Report with English translation and Written Opinion issued in corresponding application No. PCT/JP2017/034858 dated Jan. 16, 2018.
(Continued)

*Primary Examiner* — Benyam Haile
(74) *Attorney, Agent, or Firm* — Foley & Lardner LLP

(57) ABSTRACT

When updating a key to guarantee security, updating the key during decryption of update data causes an ECU to stop functioning due to a decryption failure. Therefore, an in-vehicle gateway or a key management device of the present invention includes: an update data acquisition unit that receives, from outside a vehicle, update data encrypted with a predetermined key; a key acquisition unit that receives a key from outside the vehicle; a key storage unit in which the key received by the key acquisition unit is stored; and a decryption unit that decrypts the update data acquired by the update data acquisition unit based on the key stored in the storage unit, in which the update data acquisition unit transmits a key acquisition request signal after completion of decryption of the update data by the decryption unit.

8 Claims, 5 Drawing Sheets

(51) Int. Cl.
  *H04L 9/40*     (2022.01)
  *H04W 12/03*    (2021.01)
  *H04W 12/041*   (2021.01)
  *H04W 12/0433*  (2021.01)
  *H04W 12/0471*  (2021.01)

(52) U.S. Cl.
  CPC ............. *H04W 4/44* (2018.02); *H04W 12/03* (2021.01); *H04W 12/041* (2021.01); *H04W 12/0433* (2021.01); *H04W 12/0471* (2021.01)

(58) Field of Classification Search
  CPC ....... H04L 9/0819; G06F 21/572; G06F 8/65; H04W 12/0471
  See application file for complete search history.

(56) References Cited

U.S. PATENT DOCUMENTS

| | | | |
|---|---|---|---|
| 2013/0173112 A1 | 7/2013 | Takahashi | |
| 2015/0180840 A1* | 6/2015 | Jung | ........................ G06F 8/65 713/150 |

FOREIGN PATENT DOCUMENTS

| | | |
|---|---|---|
| JP | 2014-182571 A | 9/2014 |
| JP | 2016-092811 A | 5/2016 |

OTHER PUBLICATIONS

Extended European Search Report issued in corresponding European Patent Application No. 17860484.9 dated May 15, 2020.

\* cited by examiner

IN-VEHICLE GATEWAY AND KEY MANAGEMENT DEVICE

TECHNICAL FIELD

The present invention relates to an in-vehicle gateway and a key management device.

BACKGROUND ART

In recent years, vehicles are connected to systems outside the vehicles such as servers and clouds, along with progress in safe driving assistance and automatic driving techniques. Management of encryption keys is necessary to ensure security of the communication with the outside of the vehicles.

One of background arts in this technical field is JP 2012-147270 A (PTL 1). This publication describes that "in a communication system or a communication method for maintaining security by encrypting data with a common key regarding communication between a road-side device 2 and an in-vehicle device 3 in road traffic and communication between the in-vehicle devices 3, the communication is performed by encrypting data with a common key, and the in-vehicle device 3 not only a common key that is recognized by the in-vehicle device 3 as the latest key but also a past common key. Further, the in-vehicle device 3 receives data from a communication counterpart, attempts to demodulate the received data with the common key that is recognized as the latest key, and, if the data cannot be demodulated, performs determination on whether the data can be demodulated by the past common key and determines at least relative newness and oldness of own and other common keys based on a result of the determination." (See the Abstract).

CITATION LIST

Patent Literature

PTL 1: JP 2012-147270 A

SUMMARY OF INVENTION

Technical Problem

A key to be used for center communication deployed in a vehicle needs to be updated appropriately in order to guarantee security, but the vehicle is not always in a state of being capable of communicating with the center. For example, there are cases where power is not turned on, the vehicle is out of a communication range, and the like. At this time, a key update timing deviates between the vehicle and the center in some cases. When an engine is turned off and an update is in progress in a state where downloaded encrypted data (OTA update firmware or the like) is present, it is difficult to decrypt the data if the encryption key is updated, and as a result, data decryption fails halfway. For example, when the data is update firmware of an electronic control unit (ECU), there is a problem that the ECU stops functioning due to the decryption failure.

In the technique described in PTL 1, whether a key of an ECU, which is an in-vehicle device unit, is new or old is determined, but a method for controlling a timing of updating the key in the ECU is not disclosed in PTL 1.

Therefore, an aspect of the present invention aims to enhance convenience while maintaining security strength by determining whether a process of decrypting update data is in progress and controlling a timing to execute key update confirmation.

Solution to Problem

In order to solve the above problem, an aspect of the present invention adopts the following configuration, including: an update data acquisition unit that receives, from outside a vehicle, update data encrypted with a predetermined key; a key acquisition unit that receives a key from outside the vehicle; a key storage unit in which the key acquired by the key acquisition unit is stored; and a decryption unit that decrypts the update data acquired by the update data acquisition unit based on the key stored in the key storage unit. The update data acquisition unit transmits a key acquisition request signal after completion of decryption of the update data by the decryption unit.

Advantageous Effects of Invention

According to an aspect of the present invention, whether the process of decrypting update data is in progress is determined, and the timing to execute key update confirmation is controlled, thereby enhancing convenience while maintaining security strength.

DESCRIPTION OF EMBODIMENT

Figure 1:
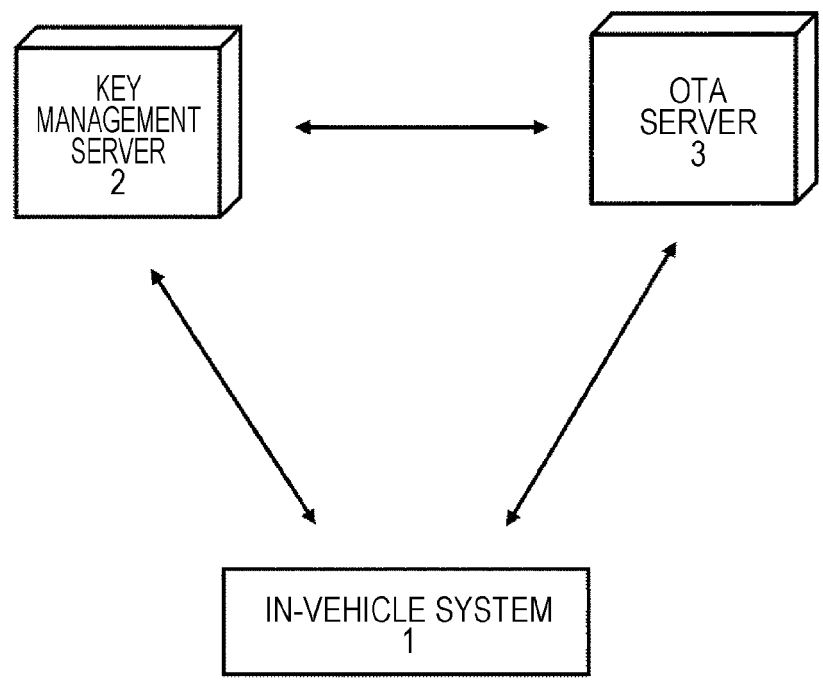
FIG. 1 is a block diagram illustrating a configuration example of an information system according to Example 1.

Hereinafter, an embodiment of the present invention will be described with reference to the attached drawings. It should be noted that the embodiment is merely an example for realizing the present invention and does not limit a technical scope of the present invention. In the respective drawings, the same reference numerals are assigned to the common components.

In the present embodiment, an example of an information system will be described.

FIG. 1 is a block diagram illustrating a configuration example of an information system which is an example of a key management system.

The information system includes, for example, an in-vehicle system 1, a key management server 2, and an OTA server 3, which are capable of communicating with each other.

Incidentally, the respective components included in the information system may be connected via a route not illustrated in FIG. 1. In addition, a certain component within the information system may include another component. For example, the OTA server 3 may include the key management server 2.

The in-vehicle system 1 is a car having a function of communicating with the key management server 2 and the OTA server 3 via a network or the like. The in-vehicle system 1 includes a plurality of ECUs as in-vehicle devices, and the respective ECUs are connected via a network in the vehicle.

The key management server 2 is a server that communicates with the in-vehicle system 1, the OTA server 3, and the like via a network or the like. The key management server 2 is a server that securely stores a public key certificate and a secret key of a public key infrastructure (PKI), or a common key of common key cryptography.

Other applications may operate in the key management server 2. In addition, a function of the key management server 2 may be divided into plurality of housings containing servers, storages, and the like, and may be configured in a combination thereof. In addition, an information device or the like which can perform similar processing may be used, without being limited to the server. These configurations are similarly adopted regarding the OTA server 3.

In addition, the key management server 2 may also have a function of receiving externally-transmitted instructions for issuing, updating, and revoking a key although not illustrated. The instruction from the outside may be received via a network or by an operation of a screen or the like.

The OTA server 3 is a server that performs communication with the in-vehicle system 1 and the key management server 2 via a network or the like. The OTA server 3 may be the same element as the key management server 2.

The OTA server 3 communicates with the ECU of the in-vehicle system 1 to distribute an update program. The update program is distributed in the state of being encrypted by the OTA server 3 and is decrypted by the ECU of the in-vehicle system 1. In addition, the OTA server 3 may be a service server having a distribution function other than the update program. For example, it is conceivable that the OTA server 3 is a server that distributes map information or a server that generally exchanges encrypted data. Alternatively, a mode in which the in-vehicle system 1 may upload encrypted data and the encrypted data is decrypted at the server may be adopted.

Although not illustrated, the OTA server 2 may have a function of receiving an externally-transmitted instruction for registration of an update program or the like. The instruction from the outside may be received via a network or by an operation of a screen or the like.

The communication between the key management server 2 and the OTA server 3 is, for example, wireless communication such as long term evolution (LTE), 3rd generation (3G), worldwide interoperability for microwave access (WiMAX), wireless local area network (LAN) or wide area network (WAN), or wired communication using wired LAN, the Internet, a dedicated line, or the like.

The communication between the in-vehicle system 1 and the key management server 2 and the communication between the in-vehicle system 1 and the OTA server 3 are, for example, wireless communication such as LTE, 3G, WiMAX, wireless LAN, and WAN. The communication between the respective components in the information system may be performed via different networks or the same network.

Figure 2:
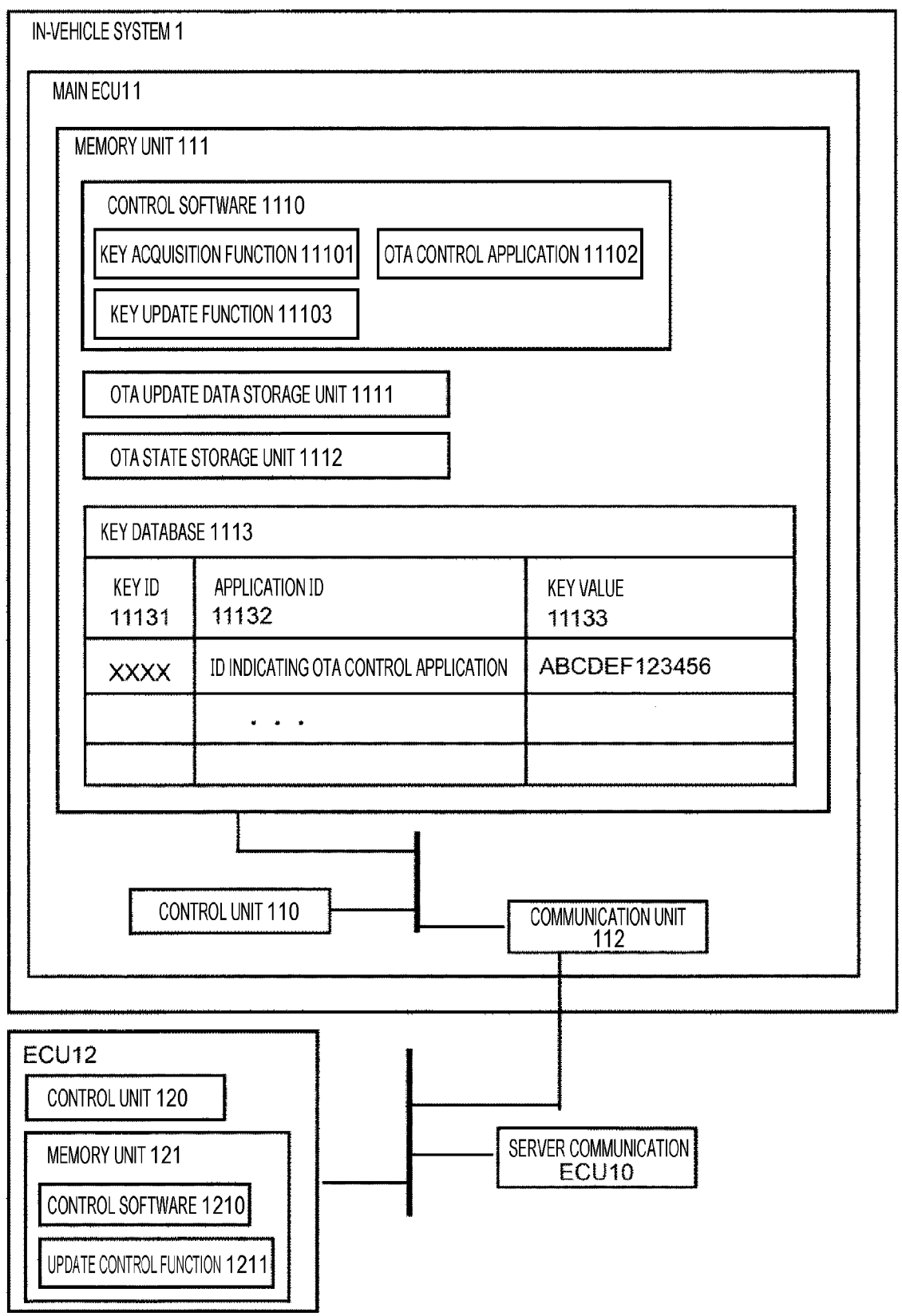
FIG. 2 is a block diagram illustrating a configuration example of an in-vehicle system 1 according to Example 1.

FIG. 2 is a block diagram illustrating a configuration example of the in-vehicle system 1. The in-vehicle system 1 includes a server communication ECU 10, a main ECU 11, and one or more ECUs 12, which are connected to each other via, for example, a control area network (CAN). The server communication ECU 10, the main ECU 11, and the ECU 12 may be connected via, for example, CAN with flexible data rate (CAN FD), Ethernet (registered trademark, hereinafter the same), or FlexRay (registered trademark, hereinafter the same).

The server communication ECU 10 communicates with other components such as the key management server 2 and the OTA server 3. The server communication ECU 10 is a module configured to perform wireless communication such as LTE, 3G, WiMAX, wireless LAN, and WAN.

Incidentally, the server communication ECU 10 may be included in the main ECU 11 or the ECU 12. In addition, the in-vehicle system 1 may include a plurality of server communication ECUs 10 appropriate for applications and communication methods. In addition, the server communication ECU 10 may also be shared with other modules that perform communication. Incidentally, the server communication ECU 10 may include an antenna, a modulation/demodulation circuit, and the like in the case of wireless communication. In the case of wired communication, the server communication ECU 10 may include a connector, a modulation/demodulation circuit, and the like.

The main ECU 11 includes, for example, a control unit 110, a memory unit 111, and a communication unit 112 connected to each other via a bus line or the like. The main ECU 11 may further include, for example, an encryption processing unit or the like that speeds up encryption processing. The main ECU 11 may be, for example, an in-vehicle gateway.

In the communication unit 112, the main ECU 11 communicates with other components of the in-vehicle system 1. The communication unit 112 is a module configured to perform communication by, for example, CAN, CAN FD, Ethernet, FlexRay, or the like. The main ECU 11 may include a plurality of the communication units 112 appropriate for applications and communication methods. In addition, the communication unit 112 may be shared with other modules that perform communication. Incidentally, the communication unit 112 may include an antenna, a modulation/demodulation circuit, and the like in the case of performing wireless communication. In the case of performing wired communication, the communication unit 112 may include a connector, a modulation/demodulation circuit, and the like.

The control unit 110 is configured using, for example, a processor (a CPU, an MPU, or a DSP) or the like, and executes a program stored in the memory unit 111 or the like. The memory unit 111 stores the program to be executed by the control unit 110 and data to be used at the time of executing the program. The memory unit 111 includes, for example, a nonvolatile storage device such as a magnetic disk, an SSD, an EEPROM, and a flash memory.

In addition, the memory unit 111 may include a memory including a ROM which is a nonvolatile storage element and a RAM which is a volatile storage element. The ROM stores an invariable program or the like. The RAM is a high-speed and volatile storage element such as a dynamic random access memory (DRAM), and temporarily stores a program to be executed by the control unit 110, and data to be used at the time of executing the program.

The memory unit 111 may include a hardware security module (HSM) that securely holds information such as a key. The memory unit 111 may be configured using a plurality of storage devices, and the respective programs and data may be divided to be stored in the plurality of storage devices.

The memory unit 111 includes, for example, control software 1110 in which software for controlling the main ECU 11 is described, an OTA update data storage unit 1111, an OTA state storage unit 1112, and a key database 1113.

The control software 1110 includes, for example, a key acquisition function 11101 and an OTA control application 11102 which are programs. The key acquisition function 11101 performs communication with the key management server 2 to confirm presence or absence of a predetermined key update, and acquires the key and updates the key database 1113 if there is the update. The confirmation of the presence or absence of the key update by the key acquisition function 11101 is performed by being triggered by, for example, activation of the vehicle, stop of the vehicle, reception of a notification from outside, own periodic processing, or the like.

The OTA control application 11102 acquires encrypted update data from the OTA server 3 and decrypts the data with a key stored in the key database. In addition, the OTA control application 11102 has a function of performing communication control to update control software of an ECU (for example, the ECU 12) to be updated. The OTA control application 11102 inquires of the OTA server 3 about presence or absence of update data. The communication for confirmation is performed by being triggered by, for example, activation of the vehicle, stop of the vehicle, reception of a notification from outside, own periodic processing, or the like. In addition, even if an abnormality such as a power supply loss during the update occurs, the OTA control application 11102 has, for the purpose of security, a function of continuing the update when the abnormality is recovered.

In addition, the control software 1110 may have a function of generating, revoking, and deleting a predetermined key in response to an instruction from the key management server 2. In addition, a configuration in which a plurality of functions is realized by a single program may be used.

In addition, the main ECU 11 may perform mutual authentication with the key management server 2. Therefore, an ID and an authentication key for authentication with the key management server 2 may be held in the memory unit 111.

The OTA update data storage unit 1111 is an area to store the update data acquired from the OTA server 3 by the OTA control application 11102. The OTA state storage unit 1112 is information indicating whether the OTA control application 11102 is updating the control software of the ECU to be updated, and is a state variable, a flag, or the like. The OTA state storage unit 1112 is also referred to in order to determine whether the key acquisition function 11101 executes a process related to key acquisition from the key management server 2. In addition, it is desirable that the OTA update data storage unit 1111 and the OTA state storage unit 1112 be arranged in a nonvolatile memory.

The key database 1113 stores information on a key held by the in-vehicle system 1. The key database 1113 is configured using, for example, a data table, a database, a hash table, or the like.

The key database 1113 includes, for example, a key ID field 11131, an application ID field 11132, and a key value field 11133. The key ID field 11131 stores a key ID corresponding to a key value included in the key value field 11133. The application ID field 11131 stores an application ID to identify an application of the in-vehicle system 1. The key ID and the application ID are, for example, numerical strings or character strings. The key database 1113 may further hold an ID to uniquely identify a key.

The key value field 11133 field stores the key value. The key value is, for example, a pair of a secret key of public key cryptography and a public key certificate or a secret key of common key cryptography, and is acquired from the key management server 2. The key value is used by the OTA control application 11102, for example.

In addition, the key database 211 may have key states such as validity and invalidity, distribution date and time, and the like as elements of fields.

The ECU 12 includes, for example, a control unit 120 and a memory unit 121 which are connected to each other via a bus line (not illustrated) or the like. The ECU 12 further includes a communication unit (not illustrated) similar to the communication unit 112.

Hereinafter, some points in the control unit 120 and the memory unit 121 that are different from the control unit 110 and the memory unit 111, respectively, will be described, and the similar points will not be described. The memory unit 121 stores control software 1210 in which software for controlling the ECU 12 is described, and an update control function 1211.

The control software 1210 is software for controlling the ECU 12 and is firmware or an application of the ECU 12. The update control function 1211 cooperates with the OTA control application 11102 of the main ECU 11 by communicating with the OTA control application 11102, and has a function of rewriting the control software 1210 and the like.

Figure 3:
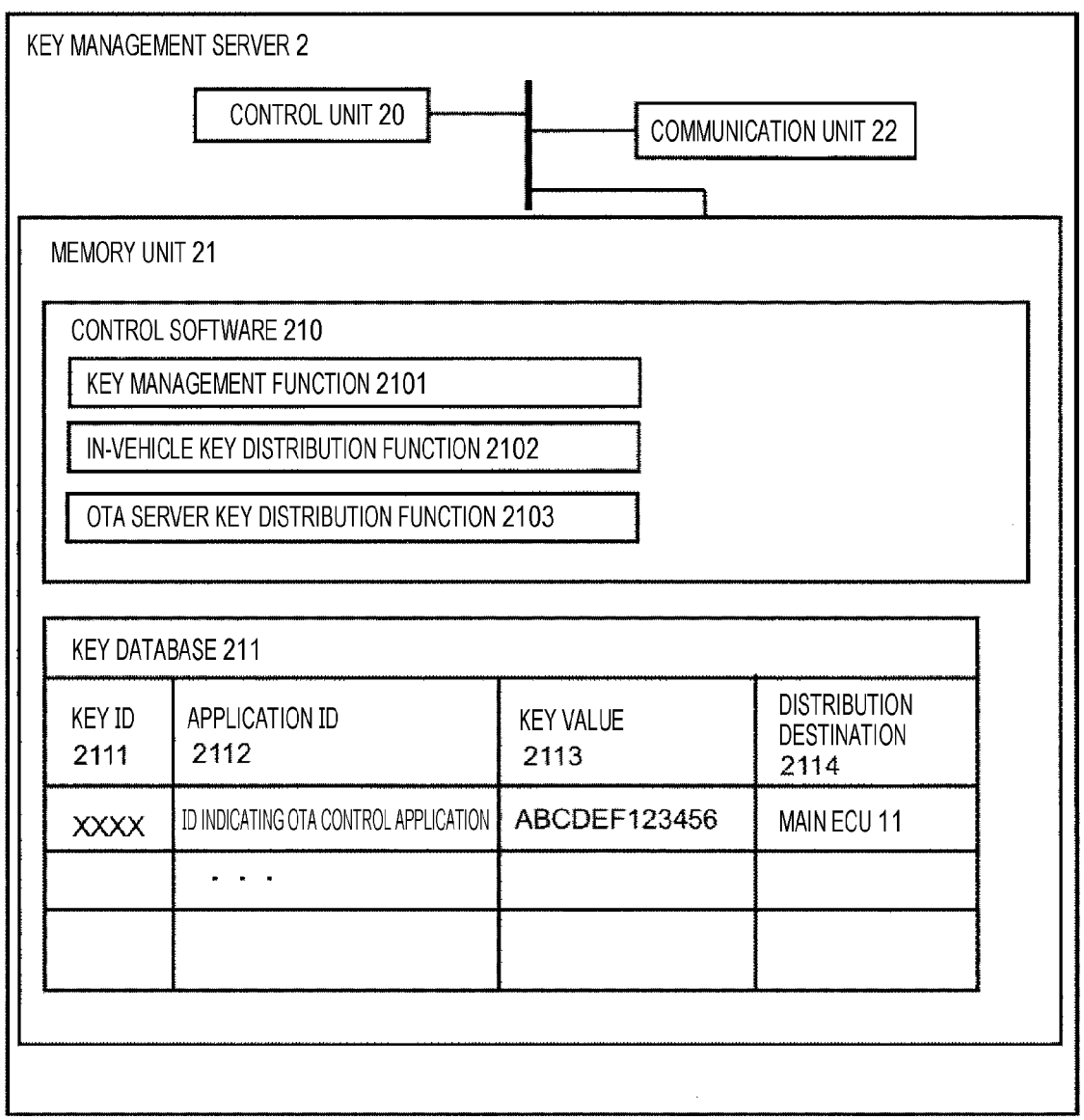
FIG. 3 is a block diagram illustrating a configuration example of a key management server 2 according to Example 1.

FIG. 3 is a block diagram illustrating a configuration example of the key management server 2. The key management server 2 includes, for example, a control unit 20, a memory unit 21, and a communication unit 22 which are connected to each other via a bus line or the like.

Incidentally, the key management server 2 may further include, for example, an encryption processing unit or the like that speeds up encryption processing.

Incidentally, the respective units in the key management server 2 are not necessarily connected via the bus line and may be electrically connected by other methods. In addition, parts that need to be mutually connected may be connected in the key management server 2. In addition, parts in separate housings may be connected electrically or using an optical wiring or the like. This also applies to configurations of other devices included in the information system.

The control unit 20 is configured using, for example, a processor (a CPU, an MPU, or a DSP) or the like, and executes a program stored in the memory unit 21 or the like. The memory unit 21 stores the program to be executed by the control unit 20 and data to be used at the time of executing the program. The memory unit 21 includes, for example, a nonvolatile storage device such as a magnetic disk, an SSD, an EEPROM, and a flash memory.

In addition, the memory unit 21 may include a memory including a ROM which is a nonvolatile storage element and a RAM which is a volatile storage element. The ROM stores an invariable program or the like. The RAM is a high-speed and volatile storage element such as a DRAM, and temporarily stores a program to be executed by the control unit 20, and data to be used at the time of executing the program.

The memory unit 21 may include an HSM that securely holds information such as a key. The memory unit 21 may be configured using a plurality of storage devices, and the respective programs and data may be divided to be stored in the plurality of storage devices.

The communication unit 22 is a module that includes a network interface device that controls communication with other components included in the information system according to a predetermined protocol, and that performs the above-described wireless communication and wired communication.

For example, the key management server 2 may include a plurality of the communication units 22 appropriate for each communication method.

In addition, the communication unit 22 may be shared with other modules that perform communication. Incidentally, the communication unit 22 may include an antenna, a modulation/demodulation circuit, and the like used for wireless communication. In addition, the communication unit 22 may include a connector, a modulation/demodulation circuit, and the like used for wired communication.

The program executed by the control unit 20 is provided to the key management server 2 via a removable medium (a CD-ROM, a flash memory, or the like) or a network, and is stored in, for example, nonvolatile auxiliary storage device which is a non-transitory storage medium included in the memory unit 21. Thus, the key management server 2 may have an interface that reads data from the removable medium.

The key management server 2 may further include an input interface and an output interface. The input interface is an interface to which a keyboard, a mouse, or the like is connected and which receives an input from an operator. The output interface is an interface to which a display device, a printer, or the like is connected and which outputs an execution result of the program in a format that the can be visually recognized by the operator.

The key management server 2 is a computer system configured physically on one computer or on a plurality of computers configured logically or physically, and may operate on separate threads on the same computer or may operate on a virtual computer constructed on a plurality of physical computer resources.

The memory unit 21 stores control software 210 and the key database 211. In the control software 210, software for controlling the key management server 2 is described. The control software 210 is software that executes a processing flow using, for example, communication from the communication unit 22, a predetermined timer, or another interrupt process as a start trigger.

The control software 210 may be a complex in which a plurality of software programs cooperates with each other. Incidentally, a case where software is described, without particular notice, such that the key management server 2 or the control software 210 executes processing indicates that, physically, the control unit 20 executes the processing in accordance with the description of the program of the control software 210. The above description of the control software 210 and the description regarding the relationship between the control software 210 and the control unit 10 are similarly applied to control software and a control unit included in another device.

The control software 210 includes, for example, a key management function 2101, a vehicle key distribution function 2102, and an OTA server key distribution function 2103 which are programs, respectively. The control software 210 is realized by a combination of these functions.

The key management function 2101 instructs the vehicle key distribution function 2102 to deliver a predetermined key to the in-vehicle system 1 or perform preparation for delivery. In addition, the key management function 2101 instructs the OTA server key distribution function 2013 to deliver a predetermined key to the OTA server 3. The key management function 2101 may also instruct generation, revocation, or deletion of a key.

In addition, the key management function 2101 has a function of updating the key database 211.

The vehicle key distribution function 2102 delivers a key to the vehicle. In addition, when there is an inquiry as to whether there is a predetermined key update from the vehicle, the vehicle key distribution function 2102 replies to the vehicle with presence or absence of the update.

Although not illustrated, the key management server 2 may have a function of performing mutual authentication with the server communication ECU 10 and the main ECU 11 of the in-vehicle system 1 and a function of performing mutual authentication with the OTA server 3. Therefore, an ID and an authentication key for authentication with the server communication ECU 10 and the main ECU 11, an ID and an authentication key for authentication with the OTA server 3 may be stored in the memory unit 21 in a table format.

The key database 211 stores information on the authentication key between the in-vehicle system 1 and the OTA server 3 distributed by the key management server 2. The key database 211 is, for example, generated in advance in response to an instruction or the like received from the key management server 2 from outside. The key database 211 is configured using, for example, a database, a hash table, or the like.

The key database 211 includes, for example, a key ID field 2111, an application ID field 2112, a key value field 2113, and a distribution destination field 2114. The key ID field 2111 stores a key ID corresponding to a key value included in the key value field 2113. The application ID field 2112 stores an application ID to identify an application of the ECU included in the in-vehicle system 1. The key ID and the application ID are, for example, numerical strings or character strings. The key database 211 may further hold an ID to uniquely identify a key.

The key value field 2113 field stores a key value. The key value is, for example, a combination of a secret key of public key cryptography and a public key certificate, or a secret key of common key cryptography. The distribution destination field 2114 stores information indicating a distribution destination of a key. Although "main ECU 11" is described in the example illustrated in the drawing, the distribution destination is specifically an ID indicating the main ECU 11 or the like.

In addition, the key database 211 may have key states such as validity and invalidity, distribution date and time, and the like as elements of fields.

Incidentally, the example in which the information used by the information system is expressed in the table format is described in the present embodiment, but the information used by the information system may be represented by any data structure without depending on the data structure. For example, data structures appropriately selected from tables, lists, databases or queues can store information. The information used by the information storage system is stored in a corresponding data storage area in a data storage device.

Figure 4:
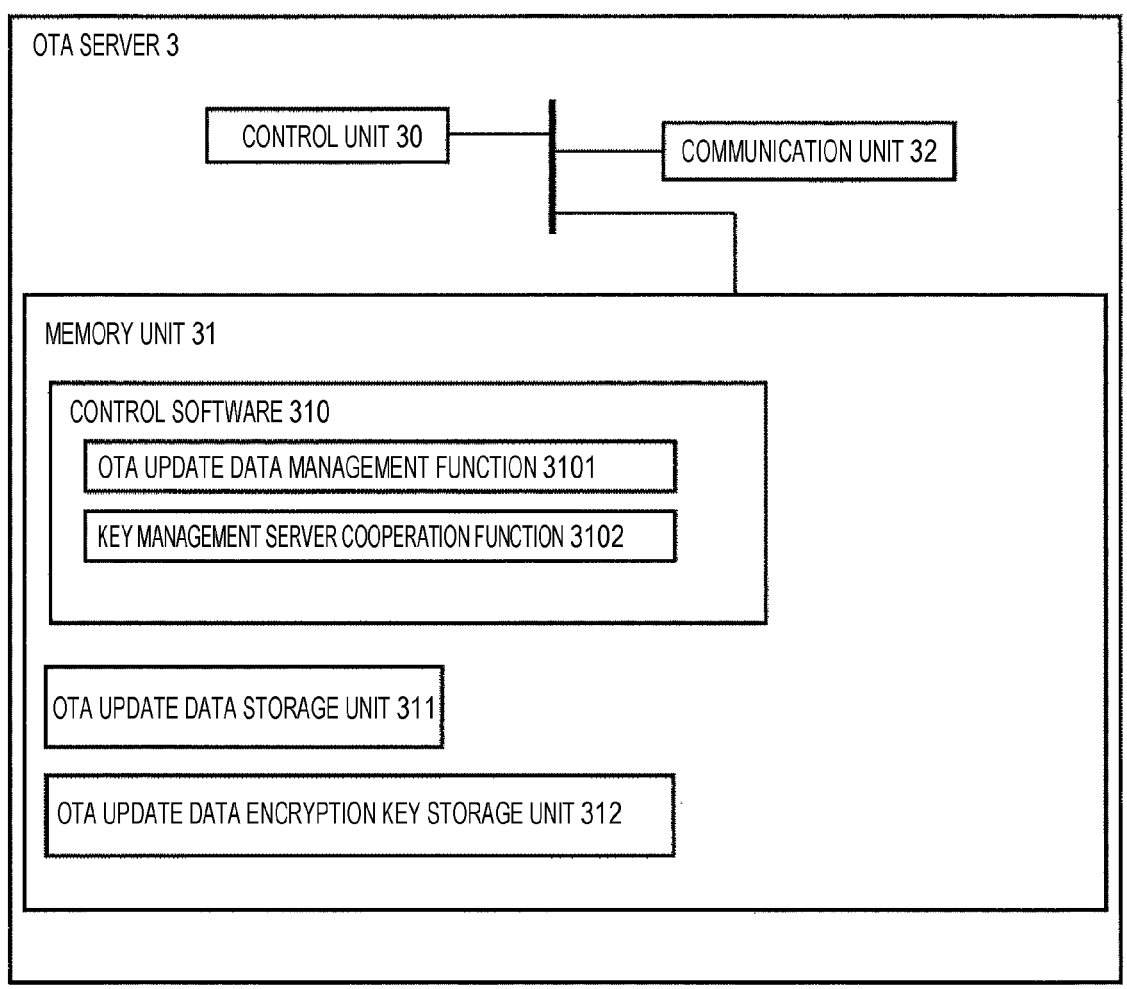
FIG. 4 is a block diagram illustrating a configuration example of an OTA server 3 according to Example 1.

FIG. 4 is a block diagram illustrating a configuration example of the OTA server 3. The OTA server 3 includes, for example, a control unit 30, a memory unit 31, and a communication unit 32 which are connected to each other via a bus line or the like.

The OTA server 3 may further include, for example, an encryption processing unit that speeds up encryption processing.

Hereinafter, some points in the control unit 30, the memory unit 31, and the communication unit 32 that are different from the control unit 20, the memory unit 21, the communication unit 22, respectively, will be described, and the similar points will not be described. The memory unit includes control software 310 in which software for controlling the OTA server 3 is described, an OTA update data storage unit 311, and an OTA update data encryption key storage unit 312.

The control software 310 includes, for example, an OTA update data management function 3101 and a key management server cooperation function 3102 which are programs, for example. The OTA data management function 3101 has a function of encrypting update data with an encryption key and sending the encrypted update data to the in-vehicle system 1. The OTA update data management function 3101 may further have a function such as registration of update data. The key management server cooperation function 3102 has a function of acquiring an update data encryption key by communicating with the key management server 2.

The OTA update data storage unit 311 stores update data to be sent to the in-vehicle system 1.

Although not illustrated in the drawing, the update data is managed by a database or the like associated with a predetermined ID in accordance with an ECU, a vehicle, a software version, and the like to be updated.

The OTA update data encryption key storage unit 312 stores an update data encryption key to encrypt the update data stored in the OTA update data storage unit 311. The update data encryption key is acquired from the key management server 2. Alternatively, the OTA server 3 may generate a key and register a key value thereof in the key management server 2. When the OTA update data storage unit 311 is managed by a database or the like, the update data and the update data encryption key are managed in association with each other.

Although not illustrated, the OTA server 2 may have a function of performing mutual authentication with the server communication ECU 10 and the main ECU 11 of the in-vehicle system 1 and a function of performing mutual authentication with the key management server 2. Therefore, an ID and an authentication key for authentication with the server communication ECU 10 and the main ECU 11, an ID and an authentication key for authentication with the key management server 2 may be stored in the memory unit 31 in a table format.

Figure 5:
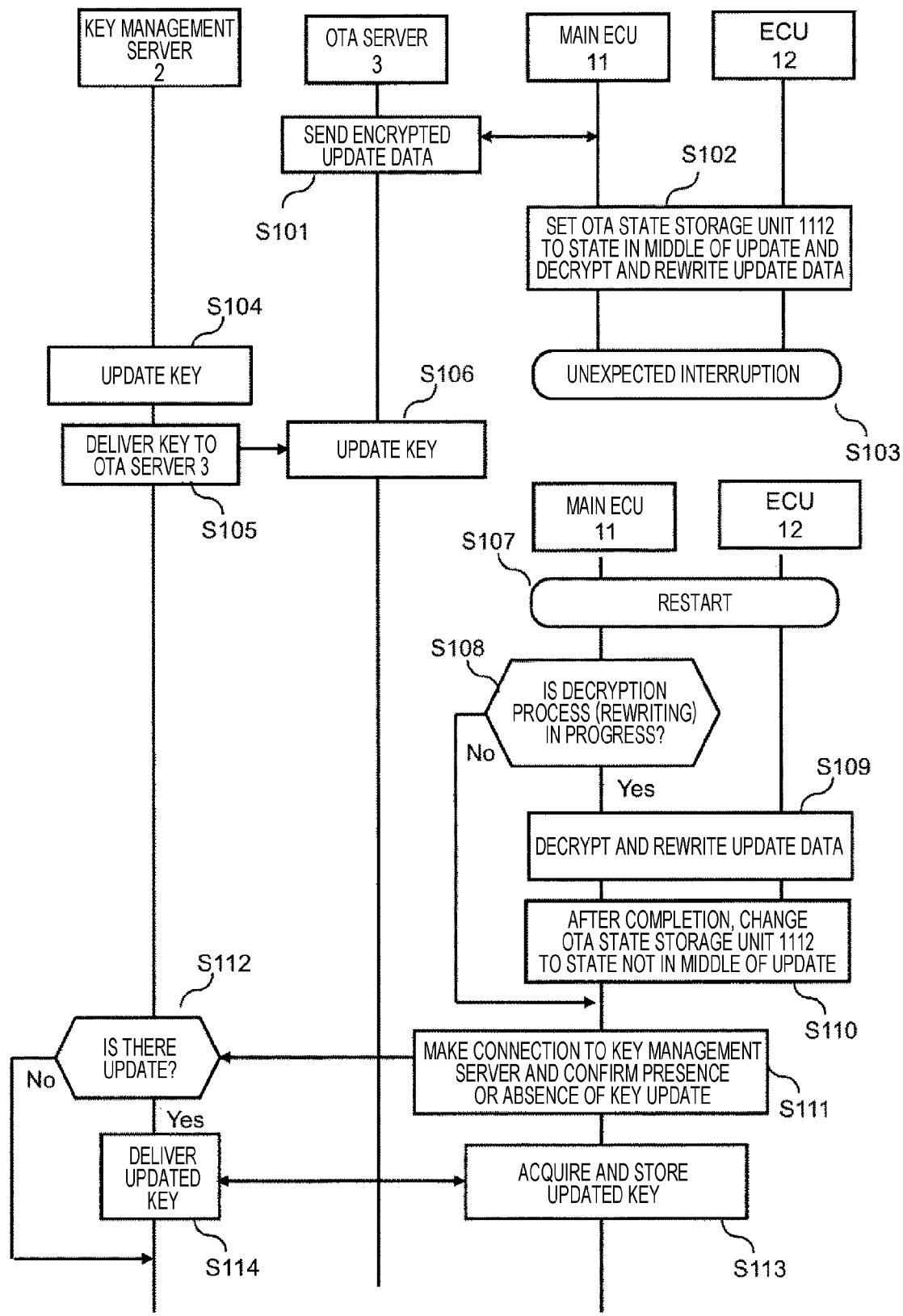
FIG. 5 is a flowchart illustrating an example of a confirmation process according to Example 1.

Hereinafter, an example of processing of the information system will be described with reference to FIG. 5. FIG. 5 is a sequence diagram illustrating a process of confirming whether decryption processing of update data is in progress when the main ECU 11 confirms with the key management server 2 whether an update key in present or absent. Hereinafter, the communication between the key management server 2 or the OTA server 3 and the main ECU 11 is relayed by the server communication ECU 10 as necessary without particular notice.

The sequence illustrated in the drawing starts from a state where keys used by both the OTA control application 11102 of the main ECU 11 and the OTA update data management function 3101 of the OTA server 3 are already acquired from the key management server 2.

First, the OTA update data management function 3101 of the OTA server sends encrypted update data to the main ECU 11 (S101). The main ECU 12 stores the acquired update data in the OTA update data storage unit 1111. S101 may be started with the fact, as a trigger, that the update data has been registered in the OTA server 3. Alternatively, the sending may be prepared with the fact, as a trigger, that the update data has been registered in the OTA server and the sending may be started when a predetermined notification from the OTA control application 11102 of the main ECU 11 arrives. The update data is stored in the OTA update data storage unit 311. In addition, the encryption of the update data is executed using a key stored in the OTA update data encryption key storage unit 312, for example, when update data has been registered in the OTA server 3.

Subsequently, in S102, the OTA control application 11102 of the main ECU 11 decrypts the update data using a key value which is an ID of the application ID field 11132 of the key database 1113 indicating the OTA control application. In addition, the OTA control application 11102 sets the OTA state storage unit 1112 in a state in the middle of an update. The OTA control application 11102 communicates with the update control function 1211 of the ECU 12 to send the decrypted update data to the ECU 12. When the update data is the control software of the ECU 12, the control software 1210 is sequentially updated by this processing.

Here, an unexpected interruption of the process of S102 occurs as an example (S103). As an example, a case where the in-vehicle system 1 stops for some reason is conceivable and, for example, a case where a power supply is lost is conceivable. At this time, it is considered that the control software 1210 of the ECU 12 is in the middle of being updated, and the ECU 12 is in the state of not operating in some cases.

Meanwhile, the key management function 2101 of the key management server 2 executes a key update process at a predetermined timing (S104). In the key updating process of S104, a key value of the key database 211 is updated. It is possible to consider that a trigger for a key update is an instruction by communication from the outside of the key management server 2, an operation on the key management server 2, periodic processing of the key management function 2101, or the like. These triggers include a key ID, an application ID, and the like. It is conceivable that S104 starts by being triggered by independence from S101 to S103. The order of S103 and S104 is not necessarily the illustrated order.

Subsequently, the key management function 2101 communicates with the key management server cooperation function 3102 of the OTA server 3 using the OTA server key distribution function 2103 and delivers a predetermined key to the OTA server 3 (S105). When receiving the key, the key management server cooperation function 3102 updates the key stored in the OTA update data key storage unit 312 (S106).

As an example, the operations of the main ECU 11 and the ECU 12 resume due to re-activation of the in-vehicle system 1 or the like after S103 (S107). Here, the key acquisition function 11101 of the main ECU 11 determines whether the OTA state storage unit 1112 indicates the state in the middle of the update (S108), and the processing proceeds to S111 when the update is not in progress (No in S108). When it is in the state in the middle of the update (Yes in S108), the decryption and rewriting of the update data resume (S109), and the state of the OTA state storage unit 1112 is changed to a state not in middle of the update when the decryption and rewriting are completed (S110).

Subsequently, the key acquisition function 11101 of the main ECU 11 communicates with the vehicle key distribution function 2102 of the key management server 2 and confirms presence or absence of a key update (S111). The vehicle key distribution function 2102 determines presence or absence of a predetermined key update in the key database 211 (S112), and ends the sequence when there is no update (No in S112). If there is an update (S112: Yes), this fact is notified to the key acquisition function 11101. The key acquisition function 11101 which has been notified communicates with the vehicle key distribution function 2102 to acquire an update key (S113, S114). The key acquisition function 11101 stores the acquired update key in the key database 1113.

Although not particularly illustrated in the sequence, it is desirable to perform mutual authentication in advance and establish an encryption session or the like in the case of executing each communication processing in the information system.

According to the processing illustrated in FIG. 4, the key is updated before the decryption and rewriting of the update data are completed, and it is possible to prevent the operation of the ECU from being stopped due to the failure of the decryption.

Incidentally, when any error occurs in the middle of executing the steps described in the present embodiment, the error may be notified to the control unit of each component of the information system.

In addition, each program included in the control software 1110, the control software 1210, the update control function 1211, the control software 210, and the control software 310 may display information indicating a process being executed on a display device or the like as necessary. It is desirable that the respective programs display information particularly indicating completion of a series of processes or occurrence of a branch process on the display device. In addition, the determination in the branch process may be executed by a user via an input device.

In addition, there is a case where exchange of information between the respective steps is not illustrated in the present embodiment, but there is a case where a pair of responses is actually made with respect to a command. In addition, even when the exchange of information between the respective steps is indicated by a set of bidirectional arrows, the exchange may include a plurality of commands and responses. In addition, even when describing the content that data is transmitted and received between entities, actual communication may be executed through commands and responses between one entity serving as a client role and the other entity serving as a server so that the data transmission as described above may be realized as a result thereof.

Incidentally, the present invention is not limited to the respective Examples described above, and includes various modifications. The above-described respective Examples have been described in detail in order to describe the present invention in an easily understandable manner, and are not necessarily limited to one including the entire configuration that has been described above. In addition, some configurations of a certain Example can be substituted by configurations of another Example, and further, a configuration of another Example can be also added to a configuration of a certain Example. Further, addition, deletion, or substitution of other configurations can be made with respect to some configurations of each Example.

In addition, a part or all of each of the above-described configurations, functions, processing units, processing means, and the like may be realized by hardware, for example, designed with an integrated circuit and the like. In addition, each of the above-described configurations, functions, and the like may also be realized by software by causing a processor to interpret and execute a program for realizing each of the functions. Information of, for example, programs, tables, and files that realize the respective functions can be stored in a recording device such as a memory, a hard disk, and an SSD, or a recording medium such as an IC card, an SD card, and a DVD.

In addition, only control lines and information lines considered to be necessary for the description have been illustrated, and all of the control lines and information lines required as a product are not necessarily illustrated. It may be considered that most of the configurations are practically connected to each other.

REFERENCE SIGNS LIST 1 in-vehicle system
2 key management server
3 OTA server

The invention claimed is:

1. An in-vehicle gateway comprising:
   an update data acquisition unit that receives, from outside a vehicle, update data encrypted with a predetermined key;
   a key acquisition unit that receives a key from outside the vehicle;
   a key storage unit in which the key received by the key acquisition unit is stored; and
   a decryption unit that decrypts the update data acquired by the update data acquisition unit based on the key stored in the key storage unit,
   wherein the key acquisition unit is configured to determine whether a storage unit is in a state in which an update is in progress, and to permit the decryption to resume in response to determining that the update is in progress,
   wherein the key acquisition unit confirms the presence or absence of the update data from outside the vehicle in response to a triggering event, the triggering event relating to behavior of the vehicle and being one of activation of the vehicle, stopping of the vehicle, reception of a notification from outside the vehicle, and vehicle periodic processing,
   wherein, after the key acquisition unit confirms the presence of the update data in response to the triggering event and after the key is stored in the key storage unit, the decryption unit pauses decryption of the update data in response to an interruption event differing from the triggering event and resumes decryption of the update data when the interruption event ends,
   wherein, when the key has not been updated before decryption of the update data, the update data acquisition unit transmits a key acquisition request signal after completion of decryption of the update data by the decryption unit,
   wherein, when the key is updated before decryption of the update data is complete, the decryption unit does not pause the decryption in response to the interruption event,
   wherein the in-vehicle gateway is configured to revoke and delete the predetermined key in response to an instruction from outside the vehicle.

2. The in-vehicle gateway according to claim 1, wherein the key acquisition unit updates the key stored in the key storage unit with a key obtained as a result of the key acquisition request signal.

3. The in-vehicle gateway according to claim 2, wherein the key acquisition unit acquires the key via a route different from a route in which the update data acquisition unit receives the update data.

4. The in-vehicle gateway according to claim 1, wherein the key acquisition unit acquires the key via a route different from a route in which the update data acquisition unit receives the update data.

5. The in-vehicle gateway according to claim 1, wherein the interruption event is a loss of power to the in-vehicle gateway.

6. A key management device comprising:
- an update data acquisition unit that receives, from outside a vehicle, update data encrypted with a predetermined key;
- a key acquisition unit that receives a key from outside the vehicle;
- a key storage unit in which the key received by the key acquisition unit is stored; and
- a decryption unit that decrypts the update data acquired by the update data acquisition unit based on the key stored in the key storage unit,
- wherein the key acquisition unit is configured to determine whether a storage unit is in a state in which an update is in progress, and to permit the decryption to resume in response to determining that the update is in progress,
- wherein the key acquisition unit confirms the presence or absence of the update data from outside the vehicle in response to a triggering event, the triggering event relating to behavior of the vehicle and being one of activation of the vehicle, stopping of the vehicle, reception of a notification from outside the vehicle, and vehicle periodic processing,
- wherein, after the key acquisition unit confirms the presence of the update data in response to the triggering event and after the key is stored in the key storage unit, the decryption unit pauses decryption of the update data in response to an interruption event differing from the triggering event and resumes decryption of the update data when the interruption event ends,
- wherein, when the key has not been updated before decryption of the update data, the update data acquisition unit transmits a key acquisition request signal after completion of decryption of the update data by the decryption unit,
- wherein, when the key is updated before decryption of the update data is complete, the decryption unit does not pause the decryption in response to the interruption event,
- wherein the in-vehicle gateway is configured to revoke and delete the predetermined key in response to an instruction from outside the vehicle.

7. The key management device according to claim 6, wherein the interruption event is a loss of power to the key management device.

8. The key management device according to claim 6, wherein the key acquisition unit acquires the key via a route different from a route in which the update data acquisition unit receives the update data.

* * * * *